T. BROWN.
MANURE SPREADER.
APPLICATION FILED NOV. 6, 1909.
1,064,960.
Patented June 17, 1913.
Fig. 1.
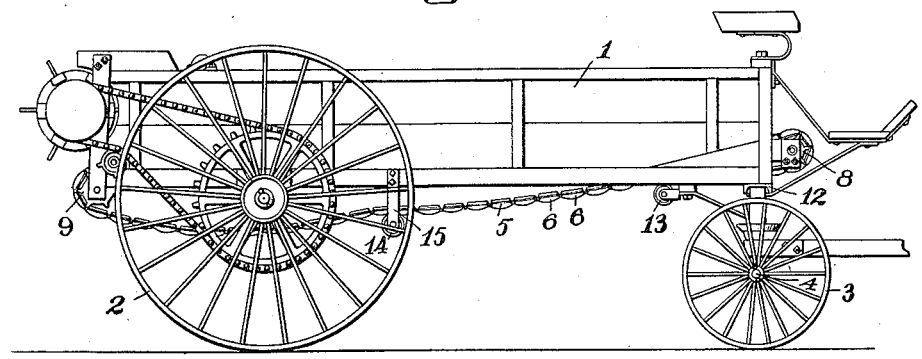
Fig. 2.
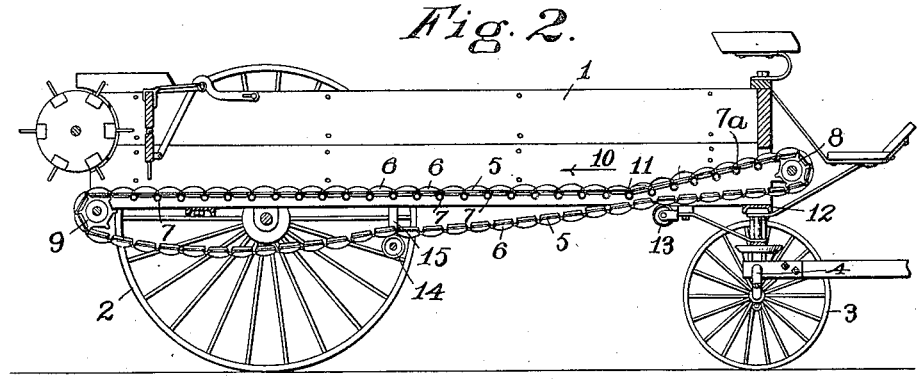
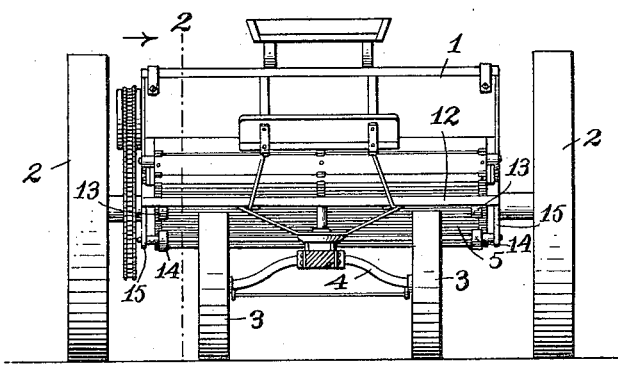
Fig. 3.
Witnesses:
R. D. Tolman
Penelope Comberbach
Inventor
Theophilus Brown.
By Rufus B. Fowler
Attorney

UNITED STATES PATENT OFFICE.

THEOPHILUS BROWN, OF WORCESTER, MASSACHUSETTS, ASSIGNOR TO RICHARDSON MANUFACTURING COMPANY, OF WORCESTER, MASSACHUSETTS, A CORPORATION OF MASSACHUSETTS.

MANURE-SPREADER.

1,064,960. Specification of Letters Patent. Patented June 17, 1913.

Application filed November 6, 1909. Serial No. 526,623.

*To all whom it may concern:*

Be it known that I, THEOPHILUS BROWN, a citizen of the United States, residing at Worcester, in the county of Worcester and Commonwealth of Massachusetts, have invented a new and useful Improvement in Manure-Spreaders, of which the following is a specification, accompanied by drawings forming a part of the same, in which—

Figure 1 is a side view of a manure spreader embodying my present invention. Fig. 2 is a longitudinal sectional view, on the plane of the broken line 2—2, Fig. 3. Fig. 3 represents the forward end of the spreader.

Similar reference characters refer to similar parts in the different figures.

My present invention relates to the construction of the movable bottom and its operating mechanism, and it has for its object to enable an endless movable bottom to be employed without interfering with the movement of the forward supporting wheels of the spreader.

Referring to the accompanying drawings 1 denotes the body of the spreader supported on the rear wheels 2 and the forward wheels 3 which, in the present instance, are smaller than the rear wheels and placed nearer together upon a front axle 4 having a hinged connection with the body of the spreader, by which the front axle may be rocked about a central vertical axis by means of a king bolt connection as is usual in vehicles of this class.

The movable bottom 5 comprises a series of narrow slats 6 hinged together and extending transversely across the body to form a bottom therefor which is supported against the load of manure resting thereon by a series of rolls 7 turning freely on gudgeons supported by the framework of the body. The slats 6 are joined together to form an endless movable bottom which is supported at its ends upon sprocket wheels 8 and 9, carried upon transverse shafts, to the rearmost one of which power is applied to rotate the sprocket wheels and move the endless bottom in the direction of the arrow 10, Fig. 2, during the operation of spreading a load of manure. The rollers 7 supporting the endless bottom are arranged in a line substantially parallel with the lower edge of the body from the rear end of the body to a point near the forward end, from which point, as at 11, Fig. 2, the supporting rollers are arranged in an ascending inclined plane, as at 7ª, Fig. 2, so as to carry the upper portion of the movable bottom over the top of the sprocket wheel 8. The sprocket wheel 8 is elevated sufficiently to allow the lower portion of the movable bottom to pass over the cross bar 12 which supports the forward end of the body and is in turn supported upon the forward axle 4. The movable bottom is arranged to run loosely over the sprockets 8 and 9 and the sagging of the upper portion of the bottom is prevented by the supporting rollers 7 and 7ª. Near the forward sprocket wheel 8 I place a roller 13 which prevents the sagging of the lower portion of the endless bottom into the space required for swinging the forward wheels beneath the body. I also preferably provide a second supporting roller 14 journaled in brackets 15 depending from the sides of the body in order to support the lower portion of the movable bottom and prevent undue sagging.

When the bottom has hitherto been made continuous in the form of an endless apron, it has been customary to either incline the entire bottom or to reduce the size of the front wheels. In the former case, the labor of loading over the sides of the body has been largely increased and, in the latter case, the use of small front wheels upon soft or uneven ground has been undesirable. I avoid the above named disadvantages and enable the main portion of the bottom, and consequently the sides, to be lowered to secure an easy loading of the spreader and, at the same time, employ front wheels of considerable size.

I claim,

1. In a manure spreader, a body, a movable bottom, a pair of parallel rows of rolls extending lengthwise the body, with the forward ends of said rows upwardly extended at an oblique angle to the remaining portion of said rows and forming a support for said movable bottom.

2. In a manure spreader, a body having a transverse cross bar at its forward end, a movable bottom for said body, sprocket wheels for supporting said movable bottom at the opposite ends of the body, with the foremost sprocket wheel elevated to carry said movable bottom above said forward cross bar, and supporting means for said movable bottom between said sprocket wheels, having an oblique angle near the foremost sprocket wheel, whereby the forward part of said movable bottom is elevated.

Dated this third day of November 1909.

THEOPHILUS BROWN.

Witnesses:
PENELOPE COMBERBACH,
NELLIE WHALEN.